United States Patent [19]

Tanaka

[11] Patent Number: 4,854,673

[45] Date of Patent: Aug. 8, 1989

[54] LENS PHOTOGRAPHING DISTANCE RANGE LIMITING DEVICE

[75] Inventor: Hitoshi Tanaka, Tokyo, Japan

[73] Assignee: Asahi Kogaku Kogyo Kabushiki Kaisha, Tokyo, Japan

[21] Appl. No.: 112,984

[22] Filed: Oct. 27, 1987

[30] Foreign Application Priority Data

Oct. 27, 1986 [JP] Japan .............. 61-164394[U]

[51] Int. Cl.$^4$ .............................................. G02B 7/04
[52] U.S. Cl. .................................................. 350/255
[58] Field of Search .............. 354/195.1; 350/255, 350/429

[56] References Cited

U.S. PATENT DOCUMENTS 3,841,735 10/1974 Katagiri et al. ............... 350/255 X
4,533,218 8/1985 Nakazato et al. ............. 350/255 X
4,639,083 1/1987 Fuziwara et al. ............. 350/429 X

FOREIGN PATENT DOCUMENTS 58-195207 12/1983 Japan .
61-66310 5/1986 Japan .

*Primary Examiner*—Michael L. Gellner
*Attorney, Agent, or Firm*—Sughrue, Mion, Zinn, Macpeak & Seas

[57] ABSTRACT

A distance range limiting device which can readily be accommodated in a miniaturized lens barrel. A limiting protrusion is formed on a rotary ring which is rotated in the focusing operation of an interchangeable lens in such a manner that the limiting protrusion is protruded radially. A switching member which can be externally turned about a rotary shaft perpendicular to the optical axis of the lens is provided on a stationary ring which covers the rotary ring, and a limiting member is provided on the switching member at a position away from the center the center of rotation of the switching member. In response to the operation of the switching member, the limiting member is moved between an interference position where the limiting member interferes with the limiting protrusion and a noninterference position where the limiting member does not interfere with the limiting protrusion.

9 Claims, 1 Drawing Sheet

FIG. 1
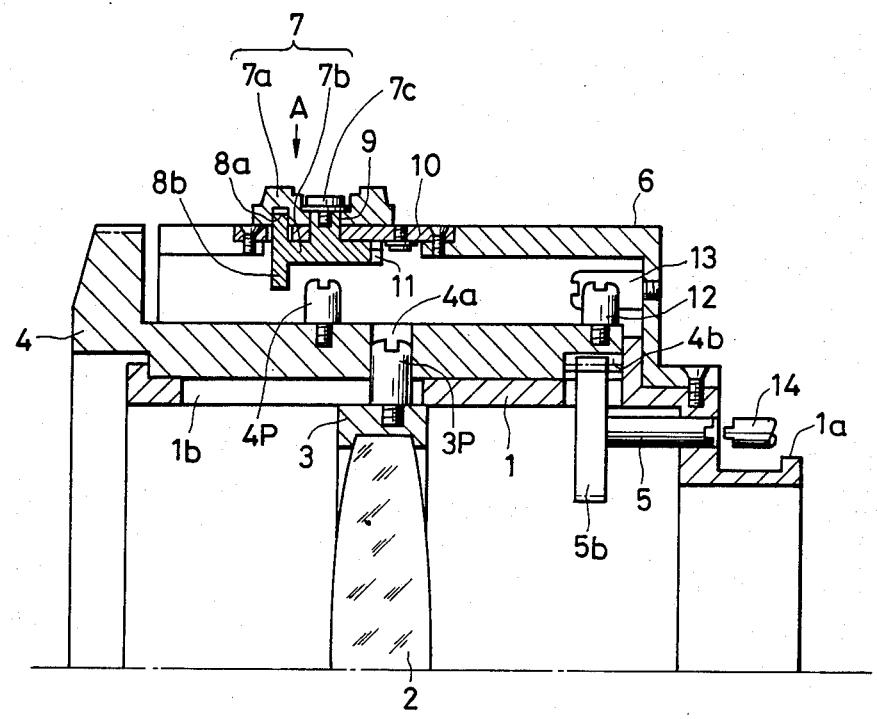
FIG. 2
FIG. 3
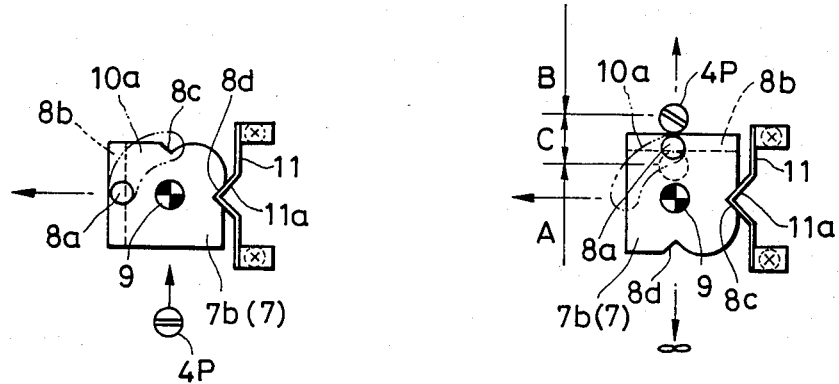

LENS PHOTOGRAPHING DISTANCE RANGE LIMITING DEVICE

BACKGROUND OF THE INVENTION

The present invention relates to an interchangeable lens barrel for an automatic focusing single-lens reflex camera or the like, and more particularly to a device for limiting the photographing distance range of the interchangeable lens barrel (hereinafter referred to as a "lens photographing distance range limiting device" when applicable).

An interchangeable lens for an automatic focusing single-lens reflex camera having a focusing lens with a large amount of movement will now be considered. In the case where it is desired to photograph an object at the closest photographing distance with such an interchangeable lens with the focusing lens set at the infinite photographing position, or vice versa, it takes a relatively long period of time for the lens to focus on the object. This difficulty is involved also in an interchangeable lens for a manual focusing single-lens reflect camera.

In order to eliminate this difficulty, a mechanism has been proposed in the art in which the photographing distance range is limited according to photographing conditions in advance, to thereby eliminate the loss of focusing time. A conventional mechanism of this type, is large in size and intricate in construction, and is not readily applicable, however, to a small lens barrel in which the available space is small. In other words, the conventional mechanism cannot be accommodated in a lens barrel without increasing the latter in size. This makes it difficult to miniaturize the lens barrel.

SUMMARY OF THE INVENTION

Accordingly, an object of the invention is to provide a photographing distance range limiting device which can be accommodated even in a small lens barrel.

A device for limiting the photographing range of an interchangeable lens barrel for a single-lens reflex camera or the like is made simple in construction according to the invention. More specifically in the device according to the invention, a limiting protrusion is formed on a rotary ring which is rotated in the focusing operation of an interchangeable lens in such a manner that the limiting protrusion is protruded radially, a switching member which can be externally turned about a rotary shaft perpendicular to the optical axis of the interchangeable lens is provided on a stationary ring which covers the rotary ring, and a limiting member is provided on the switching member at a position away from the center of rotation of the switching member so that, in response to the operation of the switching member, the limiting member is moved to an interference position where the limiting member interferes with the limiting protrusion, or a noninterference position where the limiting member does not interfere with the limiting protrusion.

BRIEF DESCRIPTION OF THE DRAWING

FIG. 1 sectional view showing essential components of an example of an interchangeable lens for an automatic focusing single-lens reflex camera with a photographing distance range limiting device according to the invention; and FIG. 2 and 3 are views taken in the direction of an arrow a in FIG. 1 different states of essential components.

DESCRIPTION OF THE PREFERRED EMBODIMENTS

A preferred embodiment of the invention will be described with reference to the accompanying drawings.

FIG. 1 is a longitudinal sectional view showing photographing distance range limiting device according to. With reference to FIG. 1, a barrel body 1 has a mounting part 1a at an end which is engaged with the mount (not shown) of a camera body. A straight guide groove 1b extends parallel to the optical axis. A focusing lens 2 is held by a movable lens frame 3. In FIG. 1, optical components other than a focusing optical system are not shown since they are unnecessary for an understanding of this invention.

The movable lens frame 3 is inserted in the lens barrel body 1, and a guide pin 3p embedded in the outer cylindrical wall of the frame 3 is engaged with the straight guide groove 1b of the lens barrel body 1 which extends in the direction of the optical axis. Therefore, the movable lens frame 3 is guided so that it is moved long the straight guide groove which is parallel to the optical axis.

A drive ring 4 for moving the movable lens frame 3 is fitted on the lens barrel body 1 in such a manner that the drive ring 4 is rotated around the optical axis but its movement in the direction of the optical axis is limited. The drive ring 4 includes a lead groove 4a extending obliquely with respect to the optical axis, and an internal gear 4b. A limit pin 4p is embedded in the outer wall (with respect to the radial direction). of the drive ring 4. The guide pin 3p extends through the straight guide groove 1b and is engaged with the lead groove 4a. The gear 4b is engaged with a drive gear 5b secured to a joint 5 coupled to the lens barrel body. The drive ring 4 is a rotary ring which is turned as the lens is focused on an object.

The drive ring 4 is inserted in an outer frame 6 secured to the lens barrel body 1 with screws. A switching member 7 positioned, for instance, at the middle of the range of movement of the limit pin 4p is rotatably supported by the outer frame 6. More specifically, the member 7 is supported on a seat plate 10 secured to an opening of the outer frame with screws. The member 7 has an operating member 7a outside the outer frame 6 and a limiting member 7b inside the outer frame 6. A rotary shaft 9 integral with the limiting member 7b penetrates the seat plate 10 and is fixed to the operating member 7a with a fixing screw 7c in such a manner that the rotary shaft 9 is perpendicular to the optical axis.

The limiting member 7b has a cylindrical part 8a located away from the rotary shaft 9 and extending towards the operating member 7a. The cylindrical part 8a extends through an arcuate groove 10a formed in the seat plate 10, and is engaged with a hole in the operating member 8a. The arcuate groove 10a of the seat plate extends through substantially a quarter of a circumference so that the angle of rotation of the switching member 7 is about 90°. The cylindrical part 8a acts to prevent the relative rotation of the operating member 7a and the limiting member 7b.

Cuts 8c and 8d are formed in the periphery of the limiting member 7b at angular intervals of 90° to click-stop the switching member 7 at both ends to the rotation angle 90° (see FIGS. 2 and 3). A leaf spring 11 secured to the seat plate 10 has a protrusion 11a engaged with the cut 8c or 8d to click-stop the limiting member 7b. The part of the periphery of the limiting member 7b located between the cuts 8c and 8d is arcuate, as shown in FIGS. 2 and 3.

The limiting member 7b has a plate-shaped limiting part 8b extending from its rear surface in such a manner that it can interfere with the limit pin 4p of the drive ring 4. When the switching member 7 is turned in one direction so that the protrusion 11a of the leaf spring 11 engages with the cut 8c, the limiting part 8b is moved to the interference position where it interferes with the limit pin 4p. When the switching member 7 is turned in the opposite direction so that the protrusion 11a engages with the cut 8d the limiting part 8b is moved to the noninterference position where it does not interfere with the limit pin 4p.

A stopper pin 12 for controlling the maximum angle of rotation of the drive ring 4 is embedded in the base (the right end in FIG. 1). Regulating pins 13 for the infinite photographing position and the closest photographing position are embedded in the lens barrel body 1 at positions so that they abut against the stopper pin 12 to define the range of rotation of the drive ring 4. In FIG. 1, reference numeral 14 designates a joint of a drive device provided in the camera body. The joint 14 is engaged with the above-described joint 5 to turn the latter to thereby drive the lens 2.

In the case where the photographing range is not limited, as shown in FIG. 2, the switching member 7 is click-stopped at one end so that the limiting part 8b is located away from the limit pin 4p. Under this condition, the focusing operation is started. That is, the rotation of the joint 14 on the camera body side is transmitted to the joint 5 of the lens side so that the drive ring 4 is rotated through the gears 5b and 4b. As the drive pin 4 is rotated in this manner, through the cooperation of the straight guide groove 1b and the lead groove 4a, the guide pin 3p, and accordingly the lens 2, are moved along the straight guide groove 1b in the direction of the optical axis. That is, the focusing operation is carried out. In this operation, the range of movement of the lens 2 is regulated by means of the stopper pin 12 and the regulating pins 13. That is, the lens can be moved from the closest photographing position to the infinite photographing position.

In the case where the photographing range is limited, according to the photographing range the drive ring 4 is turned so that the limit pin 4p is positioned on the right or left of the switching member 7. Under this condition, the switching member 7 is turned and click-stopped at one end so that the limiting part 8b protrudes into the path of the limit pin 4p, as shown in FIG. 3. As a result, the range of rotation of the drive ring 4 is limited to that (A in FIG. 3) from the position where the limit pin 4p abuts the limiting part 8b to the position where the stopper pin 12 abuts the regulating pin 13 provided for the infinite photographing position, or to that (B in FIG. 3) from the position where the limit pin 4p abuts the limiting part 8b to the position where the stopper pin 12 abuts the regulating pin 13 provided for the closest photographing position.

The object distance range limiting device of the invention, being simple both in construction and in operation, can sufficiently limit the photographing range.

In FIG. 3, reference character C designates an unfocusing range which is provided for limiting the photographing distance range. The unfocusing range is a small range which is determined from the diameter of limit pin and thickness of the limiting part of 8b. Therefore, reduction of the diameter of the limit pin 4p and the thickness of the limiting part 8b can eliminate difficulties in operation.

As is apparent from the above description, with the photographing distance range limiting device of the invention, the switching member rotatably provided on the stationary cylinder is turned so that the limiting part is located away from the center of rotation of the switching member and is positioned at the interference position where it interferes with the limiting protrusion provided on the rotary ring, or the noninterference position where it does not interfere with the limiting protrusion, to thereby limit the photographing range with ease. Thus, the photographing distance range limiting device of the invention has a low manufacturing cost, and is simple to operate.

What is claimed is:

1. In a lens photographing distance range limiting device the improvement wherein:
    a limiting protrusion is formed on a rotary ring which is rotated in the focusing operation of an interchangeable lens in such a manner that the limiting protrusion is protruded radially;
    a switching member which can be externally turned about a rotary shaft perpendicular to the optical axis of said interchangeable lens is provided on a stationary ring which covers said rotary ring, and
    a limiting part is provided on said switching member at a position away from the center of the rotation of said switching member so that, in response to an operation of said switching member, said limiting part is moved to either one of an interference position where said limiting part interferes with said limiting protrusion, and a noninterference position where said limiting part does not interfere with said limiting protrusion.

2. The lens photographing distance range limiting device as claimed in claim 1, in which the angle of rotation of said switching member is limited to 90°, and both ends of said angle of rotation are regulated by means of a click stop mechanism.

3. The lens photographing distance range limiting device as claimed in claim 1, wherein a stopper pin is formed on said rotary ring and first and second pin means for limiting movement of said stopper pin are provided on said stationary ring, and wherein when said limiting part is in said noninterference position, rotational movement of said rotary ring is limited between first and second positions at which said stopper pin contacts said first and second pin means, respectively, and when said limiting part is in said interference position, rotational movement of said rotary ring is limited between one of said first and second positions and one of respective third and fourth positions at which said limiting protrusion contacts said limiting part, depending on a position of said limiting protrusion when said switching member is operated.

4. The lens photographing distance range limiting device as claimed in claim 1, wherein said rotary ring is rotated by a drive source connected to said rotary ring at a portion thereof other than said limiting protrusion.

5. The lens photographing distance range limiting device as claimed in claim 1, wherein the angle of rotation of said switching member is limited, and both ends of said angle of rotation are regulated by means of a click stop mechanism.

6. A lens focusing device, comprising:
(a) a stationary ring;
(b) a rotary ring disposed radially inward of said stationary ring and rotatable for focusing an interchangeable lens, said rotary ring having a limiting member formed thereon and protruding radially outwardly therefrom;
(c) means for rotating said rotary ring;
(d) a switching member disposed on said stationary ring and adapted for rotation in response to external operation thereof; and
(e) a limiting part provided on said switching member at a position away from the center of rotation of said switching member so that, in response to operation of said switching member, said limiting part is moved to either one of an interference position where said limiting part interferes with said limiting protrusion, and a noninterference position where said limiting part does not interfere with said limiting protrusion.

7. The lens focusing device as claimed in claim 6, wherein a stopper pin is formed on said rotary ring, and first and second pin means for limiting movement of said stopper pin are provided on said stationary ring, and wherein when said limiting part is in said noninterference position, rotational movement of said rotary ring is limited between first and second positions at which said stopper pin contacts said first and second pins means, respectively, and when said limiting part is in said interference position, rotational movement of said rotary ring is limited between one of said first and second positions and one of respective third and fourth positions at which said limiting protrusion contacts said limiting part, depending on a position of said limiting protrusion when said switching member is operated.

8. The lens focusing device as claimed in claim 6, wherein said rotary ring is rotated by a drive source connected to said rotary ring at a portion thereof other than said limiting protrusion.

9. The lens focusing device as claimed in claim 6, wherein the angle of rotation of said switching member is limited, and both ends of said angle of rotation are regulated by means of a click stop mechanism.

* * * * *